US008620665B2

(12) United States Patent
Hasdell et al.

(10) Patent No.: US 8,620,665 B2
(45) Date of Patent: Dec. 31, 2013

(54) METHOD AND SYSTEM OF SPEECH EVALUATION

(75) Inventors: Charlie Mustafa-Ali Hasdell, London (GB); Steven Gregory Jopling, London (GB); Andrew Cameron Morris, London (GB)

(73) Assignee: Sony Computer Entertainment Europe Limited (GB)

( * ) Notice: Subject to any disclaimer, the term of this patent is extended or adjusted under 35 U.S.C. 154(b) by 133 days.

(21) Appl. No.: 13/285,412

(22) Filed: Oct. 31, 2011

(65) Prior Publication Data

US 2012/0116767 A1 May 10, 2012

(30) Foreign Application Priority Data

Nov. 9, 2010 (EP) .................................... 10190491

(51) Int. Cl.
*G10L 21/00* (2013.01)
*G09B 19/00* (2006.01)

(52) U.S. Cl.
USPC ............ 704/270; 704/275; 434/276; 434/279

(58) Field of Classification Search
USPC ............. 704/1, 231, 235, 236, 251, 270–275; 708/162; 434/276, 269, 285
See application file for complete search history.

(56) References Cited

U.S. PATENT DOCUMENTS 5,340,316 A * 8/1994 Javkin et al. .................. 434/185
5,799,276 A * 8/1998 Komissarchik et al. ...... 704/251
6,226,611 B1 * 5/2001 Neumeyer et al. ............ 704/246
7,062,441 B1 * 6/2006 Townshend .................... 704/270
8,272,874 B2 * 9/2012 Julia et al. ...................... 434/185
2002/0010587 A1 * 1/2002 Pertrushin ...................... 704/275
2004/0006468 A1 * 1/2004 Gupta et al. .................. 704/254
2004/0067472 A1 * 4/2004 Polanyi et al. ................ 434/178
2004/0186715 A1 * 9/2004 Gray et al. .................... 704/236
2006/0111902 A1 * 5/2006 Julia et al. ...................... 704/236
2007/0059670 A1 3/2007 Yates
2008/0300874 A1 * 12/2008 Gavalda et al. ............... 704/235
2010/0004931 A1 * 1/2010 Ma et al. ........................ 704/244

FOREIGN PATENT DOCUMENTS

JP 2010-191463 A 9/2010

OTHER PUBLICATIONS

European Search Report, EP 10190491, dated May 11, 2011.

* cited by examiner

*Primary Examiner* — Douglas Godbold
(74) *Attorney, Agent, or Firm* — Lerner, David, Littenberg, Krumholz & Mentlik, LLP

(57) ABSTRACT

A method is provided for user speech performance evaluation with respect to a reference performance for which a phoneme mark-up is available. The method includes capturing input speech from the user and formatting it as frames. For a respective frame of the input speech, the method generates probability values for a plurality of phonemes, generates a probability value for a phoneme class based upon the generated probability values for a plurality of phonemes belonging to that phoneme class. For a plurality of frames of the input speech, the method further includes averaging the phoneme class probability values corresponding to the plurality of frames of the input speech. The method also includes calculating a user speech performance score based upon the average.

15 Claims, 7 Drawing Sheets

| Easy | 1 | 2 | 3 | 4 | 5 | | 1 | 2 | 3 | 4 | 5 | | n1 | n2 | n3 |
|---|---|---|---|---|---|---|---|---|---|---|---|---|---|---|---|
| 1 | **69.6** | 20.2 | 32.2 | 30.2 | 41.4 | | **73.9** | 25.7 | 28.4 | 35.6 | 43.4 | | 13.2 | 30.1 | 35.0 |
| 2 | 34.6 | **49.8** | 34.8 | 29.0 | 36.1 | | 30.0 | **54.4** | 31.3 | 31.1 | 41.3 | | 10.1 | 26.7 | 29.7 |
| 3 | 30.8 | 22.0 | **60.5** | 28.6 | 33.6 | | 28.3 | 25.1 | **77.5** | 32.1 | 37.5 | | 13.5 | 27.9 | 28.4 |
| 4 | 25.0 | 19.1 | 24.3 | **67.8** | 29.2 | | 26.9 | 22.2 | 22.7 | **80.0** | 36.3 | | 9.8 | 28.2 | 30.1 |
| 5 | 26.2 | 22.5 | 28.0 | 25.4 | **63.0** | | 26.8 | 26.1 | 24.0 | 30.0 | **78.4** | | 11.1 | 28.2 | 28.4 |
| | | | | | | | | | | | | | | | |
| MIDD | 1 | 2 | 3 | 4 | 5 | | 1 | 2 | 3 | 4 | 5 | | N1 | N2 | N3 |
| 1 | **47.6** | 4.7 | 8.3 | 7.8 | 13.9 | | **56.1** | 9.3 | 9.9 | 12.1 | 16.7 | | 2.1 | 8.9 | 13.2 |
| 2 | 10.3 | **41.6** | 9.9 | 6.9 | 9.7 | | 10.0 | **49.4** | 10.7 | 10.7 | 15.5 | | 1.5 | 6.3 | 9.4 |
| 3 | 8.3 | 6.8 | **34.5** | 8.8 | 8.9 | | 8.4 | 9.0 | **62.9** | 10.5 | 14.0 | | 2.6 | 7.4 | 9.0 |
| 4 | 7.0 | 5.2 | 6.5 | **45.0** | 7.8 | | 8.8 | 7.1 | 7.4 | **64.9** | 12.8 | | 1.3 | 8.0 | 11.5 |
| 5 | 7.9 | 7.2 | 8.5 | 7.2 | **39.7** | | 9.6 | 10.5 | 8.7 | 10.2 | **61.7** | | 1.7 | 7.4 | 10.3 |
| | | | | | | | | | | | | | | | |
| HARD | 1 | 2 | 3 | 4 | 5 | | 1 | 2 | 3 | 4 | 5 | | N1 | N2 | N3 |
| 1 | **25.9** | 0.5 | 0.8 | 1.0 | 2.3 | | **33.1** | 1.5 | 1.9 | 2.3 | 3.5 | | 0.2 | 1.7 | 4.2 |
| 2 | 1.2 | **28.7** | 1.5 | 0.8 | 1.2 | | 1.7 | **34.4** | 1.6 | 1.8 | 2.9 | | 0.2 | 1.0 | 2.2 |
| 3 | 1.0 | 1.1 | **17.4** | 1.4 | 1.0 | | 1.1 | 1.4 | **40.7** | 1.9 | 2.7 | | 0.4 | 1.1 | 1.7 |
| 4 | 0.8 | 0.9 | 1.0 | **25.1** | 1.1 | | 1.1 | 0.9 | 1.1 | **41.4** | 2.1 | | 0.1 | 1.2 | 3.2 |
| 5 | 1.0 | 1.1 | 1.2 | 0.8 | **21.9** | | 1.8 | 2.2 | 1.7 | 1.5 | **38.8** | | 0.2 | 1.0 | 3.0 |

*Figure 8*

METHOD AND SYSTEM OF SPEECH EVALUATION

CROSS REFERENCE TO RELATED APPLICATIONS

The present application claims the benefit of and priority to EP Application No. 10190491.0, filed Nov. 9, 2010, the entire disclosure of which is incorporated by reference herein.

BACKGROUND OF THE INVENTION

1. Field of the Invention

The present invention relates to a system and method of speech evaluation.

2. Description of the Prior Art

The well-known videogame SingStar®, available for the Sony® Playstation 2® and Playstation 3® (PS3®), allows one or more players to sing along to pre-recorded music tracks in a similar manner to Karaoke, and provides a competitive gaming element by generating a score responsive to the user's singing.

To do this, SingStar compares the player's voice pitch to a target pitch sequence associated with a given pre-recorded track, and generates a score responsive to the user's pitch and timing accuracy with respect to this sequence.

However, a melody or pitch-based score is neither meaningful nor readily measurable for an increasing number of music tracks that feature rapping (i.e. rhythmically reciting a lyric without necessarily applying any tune) rather than singing.

Consequently the videogame RapStar, also for the PS3, generates a score based upon detected speech sounds rather than pitch. Specifically, for a given line of rap (i.e. a line of lyrics rapped by a user) four different speech sounds are distinguished using waveform analysis, and the score for the line of rap is based upon the proportion of correct instances of those four speech sounds within a timing tolerance of their expected position. This was previously considered sufficient to indicate whether the player was saying the right words in time to the line of rap.

However, this scheme does not provide either detailed or timely performance feedback to the player, and does not do an especially good job of distinguishing accurate rapping from random speech.

The present invention seeks to mitigate these problems.

SUMMARY OF THE INVENTION

In a first aspect, a method of user speech performance evaluation is provided as in claim 1.

In another aspect, an entertainment device for evaluating a user speech performance is provided as in claim 13.

Further respective aspects and features of the invention are defined in the appended to claims.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 8 is a table of speech performance evaluations derived according to an embodiment of the present invention.

DESCRIPTION OF THE PREFERRED EMBODIMENTS

A system and method of speech evaluation are disclosed. In the following description, a number of specific details are presented in order to provide a thorough understanding of the embodiments of the present invention. It will be apparent, however, to a person skilled in the art that these specific details need not be employed to practise the present invention. Conversely, specific details known to the person skilled in the art are omitted for the purposes of clarity where appropriate.

Figure 1:
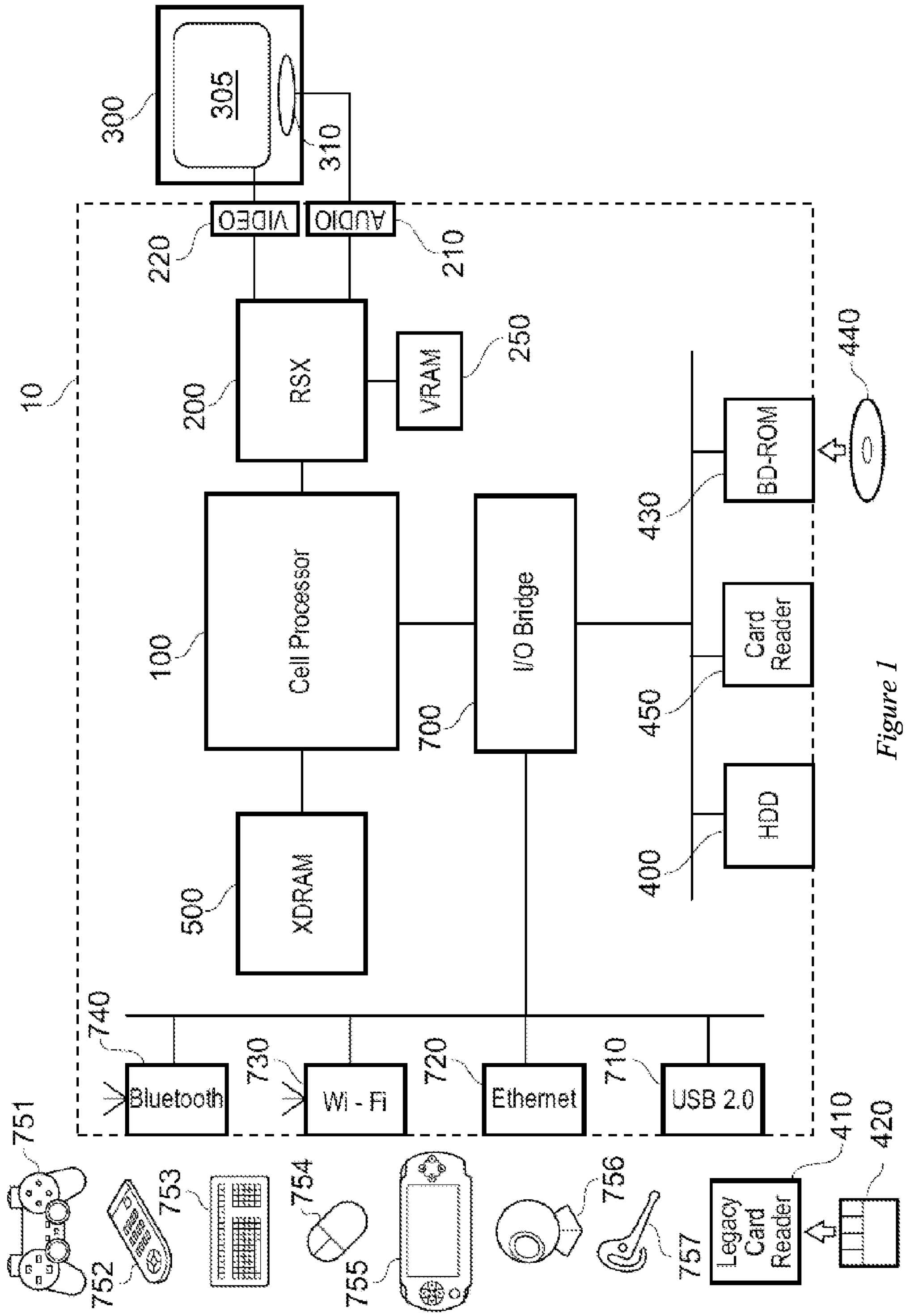
FIG. 1 is a schematic diagram of an entertainment device in accordance with an embodiment of the present invention.

FIG. 1 schematically illustrates the overall system architecture of the Sony®Playstation 3® entertainment device, which is suitable as an entertainment device for evaluating a user's speech performance with respect to a reference speech (rap) performance for which a phoneme mark-up is available, as described below.

A system unit 10 is provided, with various peripheral devices connectable to the system unit.

The system unit 10 comprises: a Cell processor 100; a Rambus® dynamic random access memory (XDRAM) unit 500; a Reality Synthesiser graphics unit 200 with a dedicated video random access memory (VRAM) unit 250; and an I/O bridge 700.

The system unit 10 also comprises a Blu Ray® Disk BD-ROM® optical disk reader 430 for reading from a disk 440 and a removable slot-in hard disk drive (HDD) 400, accessible through the I/O bridge 700. Optionally the system unit also comprises a memory card reader 450 for reading compact flash memory cards, Memory Stick® memory cards and the like, which is similarly accessible through the I/O bridge 700.

The I/O bridge 700 also connects to four Universal Serial Bus (USB) 2.0 ports 710; a gigabit Ethernet port 720; an IEEE 802.11b/g wireless network (Wi-Fi) port 730; and a Bluetooth® wireless link port 740 capable of supporting up to seven Bluetooth connections.

In operation the I/O bridge 700 handles all wireless, USB and Ethernet data, including data from one or more game controllers 751. For example when a user is playing a game, the I/O bridge 700 receives data from the game controller 751 via a Bluetooth link and directs it to the Cell processor 100, which updates the current state of the game accordingly.

The wireless, USB and Ethernet ports also provide connectivity for other peripheral devices in addition to game controllers 751, such as: a remote control 752; a keyboard 753; a mouse 754; a portable entertainment device 755 such as a Sony Playstation Portable® entertainment device; a video camera such as an EyeToy® video camera 756; and a microphone headset 757. Such peripheral devices may therefore in principle be connected to the system unit 10 wirelessly; for example the portable entertainment device 755 may communicate via a Wi-Fi ad-hoc connection, whilst the microphone headset 757 may communicate via a Bluetooth link.

The provision of these interfaces means that the Playstation 3 device is also potentially compatible with other peripheral devices such as digital video recorders (DVRs), set-top boxes, digital cameras, portable media players, Voice over IP telephones, mobile telephones, printers and scanners.

In addition, a legacy memory card reader 410 may be connected to the system unit via a USB port 710, enabling the reading of memory cards 420 of the kind used by the Playstation® or Playstation 2® devices.

In the present embodiment, the game controller 751 is operable to communicate wirelessly with the system unit 10 via the Bluetooth link. However, the game controller 751 can instead be connected to a USB port, thereby also providing power by which to charge the battery of the game controller 751. In addition to one or more analogue joysticks and conventional control buttons, the game controller is sensitive to motion in 6 degrees of freedom, corresponding to translation and rotation in each axis. Consequently gestures and movements by the user of the game controller may be translated as inputs to a game in addition to or instead of conventional button or joystick commands. Optionally, other wirelessly enabled peripheral devices such as the Playstation Portable device may be used as a controller. In the case of the Playstation Portable device, additional game or control information (for example, control instructions or number of lives) may be provided on the screen of the device. Other alternative or supplementary control devices may also be used, such as a dance mat (not shown), a light gun (not shown), a steering wheel and pedals (not shown) or bespoke controllers, such as a single or several large buttons for a rapid-response quiz game (also not shown).

The remote control 752 is also operable to communicate wirelessly with the system unit 10 via a Bluetooth link. The remote control 752 comprises controls suitable for the operation of the Blu Ray Disk BD-ROM reader 430 and for the navigation of disk content.

The Blu Ray Disk BD-ROM reader 430 is operable to read CD-ROMs compatible with the Playstation and PlayStation 2 devices, in addition to conventional pre-recorded and recordable CDs, and so-called Super Audio CDs. The reader 430 is also operable to read DVD-ROMs compatible with the Playstation 2 and PlayStation 3 devices, in addition to conventional pre-recorded and recordable DVDs. The reader 430 is further operable to read BD-ROMs compatible with the Playstation 3 device, as well as conventional pre-recorded and recordable Blu-Ray Disks.

The system unit 10 is operable to supply audio and video, either generated or decoded by the Playstation 3 device via the Reality Synthesiser graphics unit 200, through audio and video connectors to a display and sound output device 300 such as a monitor or television set having a display 305 and one or more loudspeakers 310. The audio connectors 210 may include conventional analogue and digital outputs whilst the video connectors 220 may to variously include component video, S-video, composite video and one or more High Definition Multimedia Interface (HDMI) outputs. Consequently, video output may be in formats such as PAL or NTSC, or in 720 p, 1080 i or 1080 p high definition.

Audio processing (generation, decoding and so on) is performed by the Cell processor 100. The Playstation 3 device's operating system supports Dolby® 5.1 surround sound, Dolby® Theatre Surround (DTS), and the decoding of 7.1 surround sound from Blu-Ray® disks.

In the present embodiment, the video camera 756 comprises a single charge coupled device (CCD), an LED indicator, and hardware-based real-time data compression and encoding apparatus so that compressed video data may be transmitted in an appropriate format such as an intra-image based MPEG (motion picture expert group) standard for decoding by the system unit 10. The camera LED indicator is arranged to illuminate in response to appropriate control data from the system unit 10, for example to signify adverse lighting conditions. Embodiments of the video camera 756 may variously connect to the system unit 10 via a USB, Bluetooth or Wi-Fi communication port. Embodiments of the video camera may include one or more associated microphones and also be capable of transmitting audio data. In embodiments of the video camera, the CCD may have a resolution suitable for high-definition video capture. In use, images captured by the video camera may for example be incorporated within a game or interpreted as game control inputs.

In general, in order for successful data communication to occur with a peripheral device such as a video camera or remote control via one of the communication ports of the system unit 10, an appropriate piece of software such as a device driver should be provided. Device driver technology is well-known and will not be described in detail here, except to say that the skilled man will be aware that a device driver or similar software interface may be required in the present embodiment described.

The software supplied at manufacture comprises system firmware and the Playstation 3 device's operating system (OS). In operation, the OS provides a user interface enabling a user to select from a variety of functions, including playing a game, listening to music, viewing photographs, or viewing a video. The interface takes the form of a so-called cross media-bar (XMB), with categories of function arranged horizontally. The user navigates by moving through the function icons (representing the functions) horizontally using the game controller 751, remote control 752 or other suitable control device so as to highlight a desired to function icon, at which point options pertaining to that function appear as a vertically scrollable list of option icons centred on that function icon, which may be navigated in analogous fashion. However, if a game, audio or movie disk 440 is inserted into the BD-ROM optical disk reader 430, the Playstation 3 device may select appropriate options automatically (for example, by commencing the game), or may provide relevant options (for example, to select between playing an audio disk or compressing its content to the HDD 400).

In addition, the OS provides an on-line capability, including a web browser, an interface with an on-line store from which additional game content, demonstration games (demos) and other media may be downloaded, and a friends management capability, providing on-line communication with other Playstation 3 device users nominated by the user of the current device; for example, by text, audio or video depending on the peripheral devices available. The on-line capability also provides for on-line communication, content download and content purchase during play of a suitably configured game, and for updating the firmware and OS of the Playstation 3 device itself. It will be appreciated that the term "on-line" does not imply the physical presence of wires, as the term can also apply to wireless connections of various types.

Figure 2:
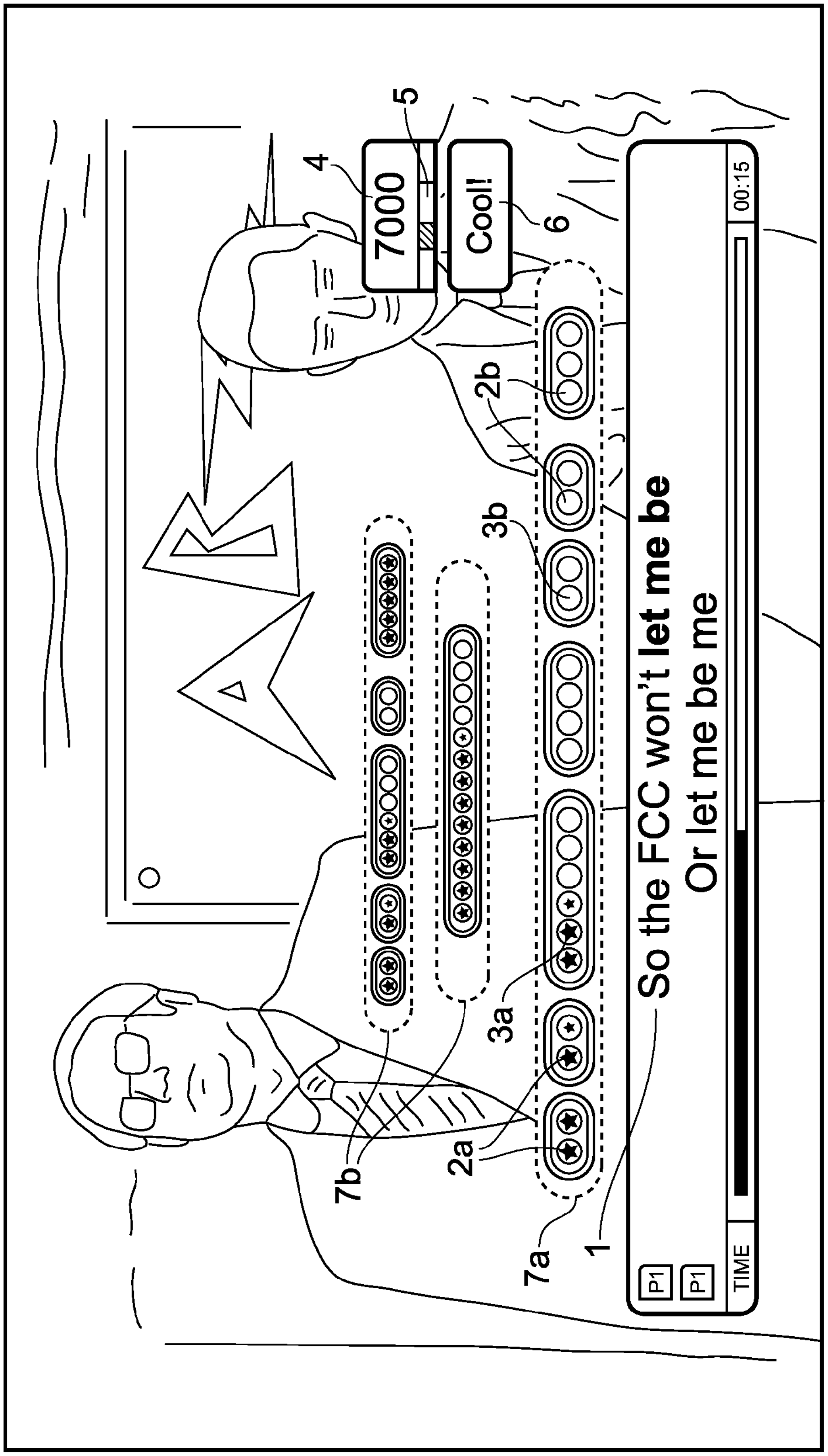
FIG. 2 is a schematic diagram of a feedback display in accordance with an embodiment of the present invention.

Referring now to FIG. 2, it has been recognised that rapping in a video game is inherently more difficult than singing. This is in part because the rate of lyrics to perform is often much greater than in more conventionally performed songs. Consequently players often do not get enough time to assimilate performance feedback between reading the lines of rap. Therefore anything that makes the performance feedback less directly related to the user's current actions then makes the assimilation of performance feedback more difficult still.

Consequently feedback for a complete line of rap, which by definition can only be provided once the line of rap is complete, makes it difficult for a player to determine their performance on any particular word or section of that line of rap. This in turn makes player improvement difficult and leads to frustration.

Moreover, a coarse scoring mechanism based on a few speech sounds and/or on a whole line of rap makes clear differentiation of player performance, and hence the competitive aspect of the game, more difficult to achieve.

Consequently embodiments of the present invention provide word-by-word performance feedback indicating how well each word was rapped by the player.

Notably, however, the player's performance is not evaluated using a conventional speech recognition system, as will be detailed later.

The feedback mechanism is outlined with respect to FIG. 2, before describing the underlying evaluation mechanism.

FIG. 2 illustrates the user interface in accordance with an embodiment of the present invention. In addition to the background video showing the reference performance (in this example, Eminem's "Without Me"), the following interface features are provided.

The current and optionally next lyric lines 1 are displayed, optionally with a colour change to the lyrics or other indicator of progress (such as a bouncing ball) relating the text of the current lyrics to their performance within the background video.

Because reading and reproducing rap tends to require more concentration than reading and reproducing more musical lyrics, as noted previously it is more difficult for the user to assimilate their own performance. Consequently several features of the user interface are intended to provide easy assimilation of user performance for individual words and lyric lines.

So-called 'rap-notes' 2*a*, 2*b* are lozenge-shaped graphic elements, each corresponding to a word in the lyrics of the reference performance in the background video. Notably, the rap notes contain one or more empty holes or spaces 3*b* that may be filled with so-called 'crystals' 3*a* according to the user's performance, as detailed later. Notably, the length of the rap notes and the number of empty spaces available is not directly related to the number of syllables or phonemes in the corresponding word, but is instead derived from rhythm data assigned to the corresponding word in the reference performance and hence relate to the performed reproduction of that word. Hence during the game the rap notes are modified to wholly or partially fill one or more of the empty spaces with crystals as a function of both the user's performance of the word and the number of empty spaces in that rap note.

This is apparent for example in the lower set of rap notes 7*a* of FIG. 2, where the third rap note, corresponding to the three syllable word 'F-C-C', has six crystals, whilst the fourth rap note corresponding to the one syllable word 'won't' has four crystals. Meanwhile the rap note corresponding to the one syllable word 'me' has two crystals whilst the rap note corresponding to the one syllable word 'be' has three crystals. Hence the syllable-to-crystal ratios are 3:6, 1:4, 1:2, 1:3. It will be seen therefore that there is not a consistent, fixed correspondence between syllables and crystals. A similar lack of correspondence can also be demonstrated for phonemes.

The correspondence between crystals and duration/rhythm rather than syllables or phonemes helps the user to more quickly relate their subjective impression of their performance of the word to a scoring scheme responsive to rhythms that are evident in the video's reference performance.

In addition, the results for the preceding one or two lines of rap 7*b* may be shown, so that the user can quickly see their recent performance; for example when glancing up from the lyrics between lines of rap.

Finally, for a two-player game, the colour of the rap notes can be chosen to correspond to the colour of the two microphones typically used, which in turn is selected at manufacture and communicated to the entertainment device as a property of their communication (e.g. according to different respective radio frequencies, or according to a flag or other code in identification data transmitted by one or both microphones).

In addition to the rap notes, a numerical score 4 is given, optionally together with a performance meter 5. The performance meter indicates how the current score compares to the best possible score at the current point in the video performance. As will be explained later in the description, the scores for a plurality of different rap songs may be normalized so each have the same best possible score, independent of the length and number of lyrics of each rap song.

Other performance feedback, such as a comment 6 relating to performance on a particular word or line of lyrics may also be provided.

As noted above, the crystals are awarded to the user according to their performance of a word and not directly according to detected syllables or phonemes associated with the word. The mechanism used to evaluate the user's performance and hence calculate the number of crystals to award is discussed below.

Conventional speech recognition systems typically use Hidden Markov Models (HMMs) pre-trained on a relevant language. The models are trained using a large amount of word-labelled speech from many different speakers. Typically the speech is segmented, for example into 25 millisecond overlapping frames for each 10 millisecond time step, and then represented in a form that improves the discrimination of phonetic features, such as the well-known Mel-cepstrum. The HMM states are trained using these Mel-cepstrum segments.

Upon training, in typical methods each HMM state represents the start, middle or end of a phoneme, and uses a Gaussian mixture model probability density function (GMM PDF) to capture different pronunciation variants and so improve speaker independence.

Such techniques are well known in the art and are not discussed further here.

In subsequent use, in response to input speech (similarly formatted as Mel cepstrum speech frames), the HMM treats the input speech as an observation sequence, and using for example the well-known Viterbi algorithm can find the most likely state sequence (phoneme sequence) to account for the observed speech.

A pronunciation dictionary is then used to relate the identified phoneme sequence to a word in the supported vocabulary, thereby recognising the word or words in the input speech. In this way a conventional speech recognition system can potentially recognise any word described in its dictionary. Again, such techniques are well known in the art and are not discussed further here.

For conventional speech recognition systems, there is a necessary requirement to maximise the discrimination of phonemes and to accurately relate the selected phoneme sequence to the dictionary, so as to maximise the recognition rate of the system. Further additional methods can be used to improve the recognition of such unscripted, free speech, such as selection constraints that rely on grammar.

However, for the RapStar scoring problem, the present inventors have appreciated that conventional speech recognition performance of this type is not appropriate.

As noted above, the Viterbi algorithm identifies the most probable state sequence in the HMM that accounts for the unknown observed speech. However, in conventional speech recognition systems, as a consequence of the requirement to maximise discrimination between phoneme sequences for different words, the resulting probabilities for the 'winning' selected sequence are firstly very low and more particularly are highly variable.

This is not a problem when the purpose of the system is to discriminate between a large number of possible words to generate a high accuracy recognition rate when recognising unscripted speech, but it is a significant problem when the purpose of the system is to evaluate the performance of a scripted rap, because if the HMM sequence output and associated probabilities are highly variable, it makes consistent game scoring very difficult.

Other factors that contribute to low and variable per-frame phoneme scores include:

i. word alignment errors;
ii. phoneme alignment errors;
iii. phoneme labelling errors;
iv. low phoneme recognition accuracy (speaker independent phoneme recognition accuracy may typically be 60%);
v. phoneme label ambiguity; single dipthongs and monophone pairs can be easily interchanged, affecting pronunciation dictionaries and training labels;
vi. user pronunciation, which can vary considerably; and
vii. state granularity; quantization errors can dominate scoring of rapid speech (such as frequently occurs in rap) as phoneme lengths approach the 10 ms speech frame length.

Figure 3:
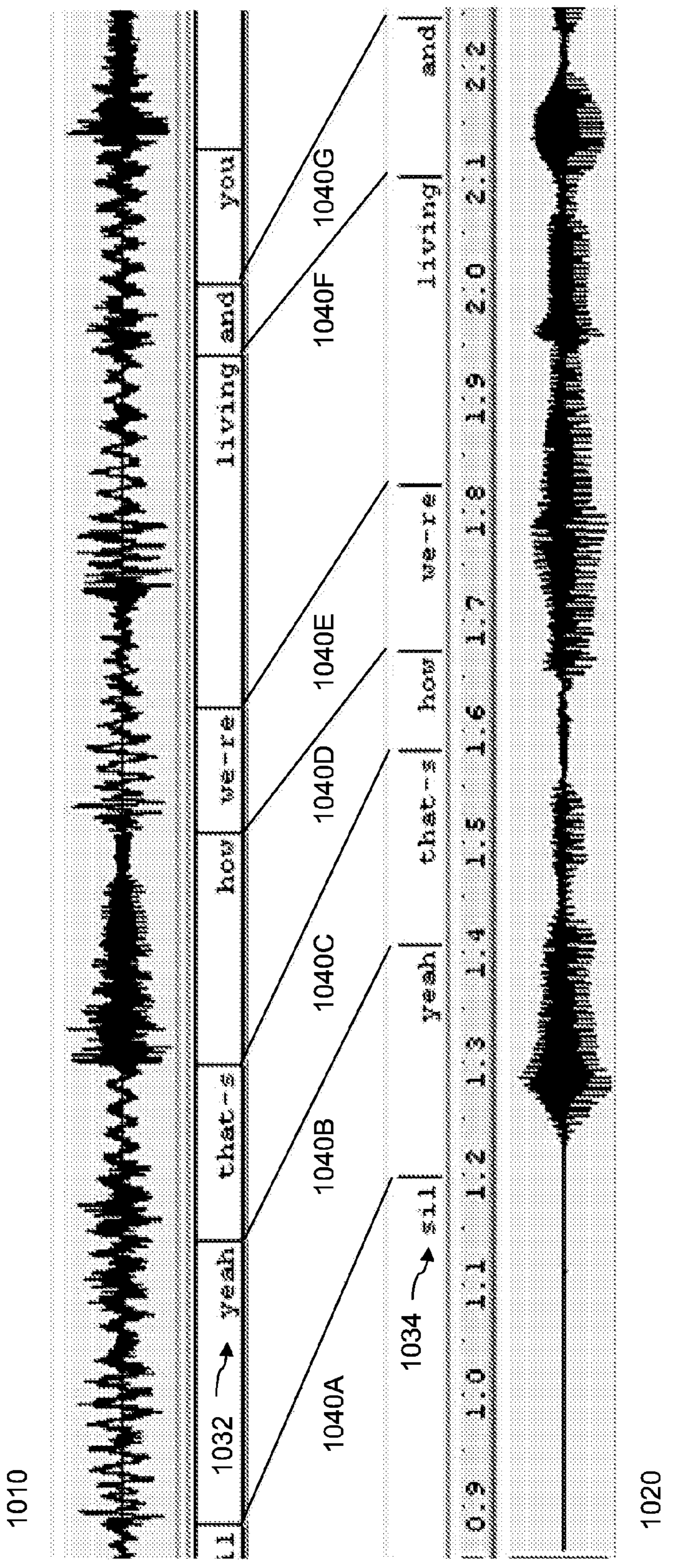
FIG. 3 is a schematic diagram illustrating typical misalignment between user and reference performances of a rap song.

Referring now to FIG. 3, to mitigate this problem, in an embodiment of the present invention the user's input speech is pre-processed to align the speech (thereby reducing a first source of variability), before a scripted HMM state sequence corresponding to the aligned speech is analyzed to assess the user's performance.

Firstly, the speech is formatted as Mel-cepstrum speech frames, as described previously. Optionally, frequencies below 300 Hz may be filtered out, reducing speech variability between the sexes and also reducing the tonality of the speech signal, making the resulting models less sensitive to whether a rap song includes speech only or also some sung lyrics.

In this respect, several of the PS3's input modalities, such as wifi, Bluetooth® or USB connections to a microphone may act in conjunction with processing operations of the Cell processor as an audio input operable to capture input speech from the user and format it as frames of the type described above.

FIG. 3 illustrates input speech data 1010 for a user in the top section, showing a trace with speech amplitude on the Y axis and time on the X axis, and which has been manually labelled with the spoken words 1032 for clarity of explanation, but clearly would not be pre-labelled in embodiments of the present invention. The corresponding reference speech data from the reference performance in the video is illustrated in the bottom section 1020, again with a series of labels for clarity. In this case, however, a phoneme mark-up for the reference performance is available. Boundary comparisons 1040A-G then illustrate the variable mis-alignment of the user's speech and the reference speech. This typically comprises a relatively constant delay factor relating to the user's reaction times and audio propagation effects within the play environment, and also variability in the user's pronunciation and general performance.

It is clear that a direct comparison of the user input to the reference performance (even using a constant or time averaged delay factor) would result in a relatively poor match between phonemes of the input speech and the marked-up phonemes of the reference performance's speech.

Therefore as a pre-processing step, the input audio is aligned to better match the phoneme mark-up associated with the reference performance.

Conventional forced alignment of this kind uses dynamic programming (DP) to find the most probable alignment (according to the HMM speech model) of the input speech with the song markup. This is a computationally expensive process, requiring the evaluation of an NxT cost matrix C, where N is the total number of phoneme states and T is the number of 10 ms time steps in the song. The cost value at C(n,t) is the negative logarithm of the model estimate for the maximum possible probability of the sequence so far to the current phoneme state. Once the song is complete, the lowest cost alignment can be obtained by tracing back from the top right corner of the cost matrix to the bottom left corner.

However, as noted previously it is desired to provide a performance estimate that improves upon the line-by-line estimate previously achieved in RapStar. Consequently the above alignment process would be too slow.

Figure 4:
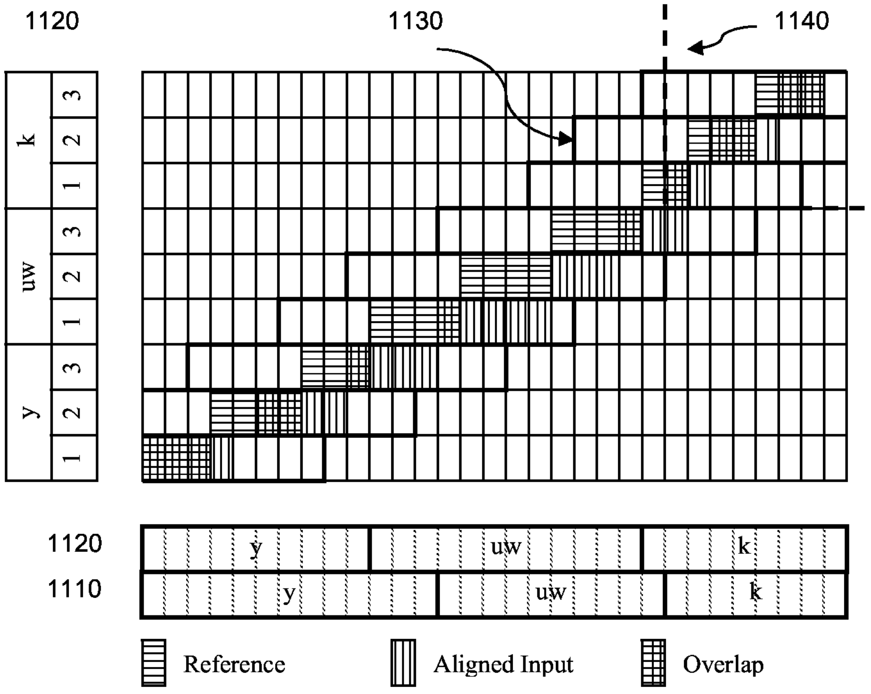
FIG. 4 is a schematic diagram of a cost matrix for a forced time alignment algorithm in accordance with an embodiment of the present invention.

Referring to FIG. 4, a more responsive performance estimate is provided by a run-time forced alignment using a dynamic programming method that applies as a constraint to the alignment process that the speech frames (and hence the input phoneme boundaries) cannot be time shifted by more than a maximum permissible preset period of dT milliseconds. This means that the cost matrix C is only populated in a diagonal band dT/10 ms units (i.e. frames) wide.

Moreover, a local cost-matrix for the current word is used that is limited to the phoneme boundary preceding the last phoneme of the previous word and the phoneme boundary following the first phoneme of the next word.

This allows the local alignment to be estimated quickly and with significantly less computation.

In FIG. 4, this is illustrated with the start of a rap line 'You can't touch this', in which the phonemes 'y' and 'uw' of the word 'you' and the phoneme 'k' of the next word 'can't' are aligned, in order to align the word 'you'.

The reference phoneme sequence 1120 is listed up the y-axis, with three states for each phoneme (beginning, middle and end). The reference timing for this sequence is illustrated for respective y-axis positions as non-overlapping timings along the x-axis. In each case the phoneme boundary constraint dT limits the region for alignment to a boundary 1130 with respect to each reference phoneme state, here illustrated as ±50 ms (five 10 ms units).

The non-overlapping time-aligned input speech frames for each phoneme states are then also illustrated for respective y-axis positions along the x-axis.

Finally the reference 1120 and input 1110 phonemes are also marked up at the bottom of the figure, for clarity of explanation only.

The trace back from the top-right to bottom left of the cost matrix determines the chosen alignment. In this process, the contribution 1140 of the trace back not related to the present word 'you' can be discarded.

Referring to the key provided with FIG. 4, the reference phoneme state intervals (key: 'reference' and 'overlap') are associated with respective alignment boundaries 1130 dependent upon the value of dT. The selected speech alignment (key: 'aligned speech' and 'overlap') then represents the best (lowest) cost alignment for the word 'you'. In the illustrated example, the singer's rendition of 'you' lingers on the 'y' phoneme, so that the 'uw' phoneme is relatively late, but then appears to substantially re-synchronise for the 'k' phoneme at the start of the next word 'can't'.

Formally:

X=(x[1] . . . x[T]) where x[t] is the speech frame at time step t.

M=(m[1] . . . m[T]) where m[t] is the mark-up phoneme HMM state at time step t.

Q=(q[1] . . . q[T]) where q[t]=m[t] is the phoneme state finally aligned with x[t].

W=(w[1] . . . w[T]) where w[t] is the required alignment or time warping, with q[t]=m[w[t]]=m[t].

dT is the maximum permitted time warp, typically but not limited to 200-300 ms. A longer maximum value generally gives more accurate eventual scores but introduces more delay. A desired trade-off between these factors can be determined by the designer of the system.

f(q, x) is the log of the GMM PDF function of x for phoneme HMM state q. This is a GMM function of x, for each q, trained on speech from the language currently in use.

W is then obtained as arg max over W* (i.e. over all W as constrained by dT) of p(X|M,W), which can be approximated as arg max over W* of product over t of p(x[t]|m[w(t)=t]), which in turn can be approximated as arg max over W of sum over t of log p(x[t]|m[t]), subject to |t−t|<dT, which in turn can be approximated as arg max over W of sum over t of f(m[t],(x[t]), subject to |t−t|<dT, where m[tC]=q[t].

Figure 5:
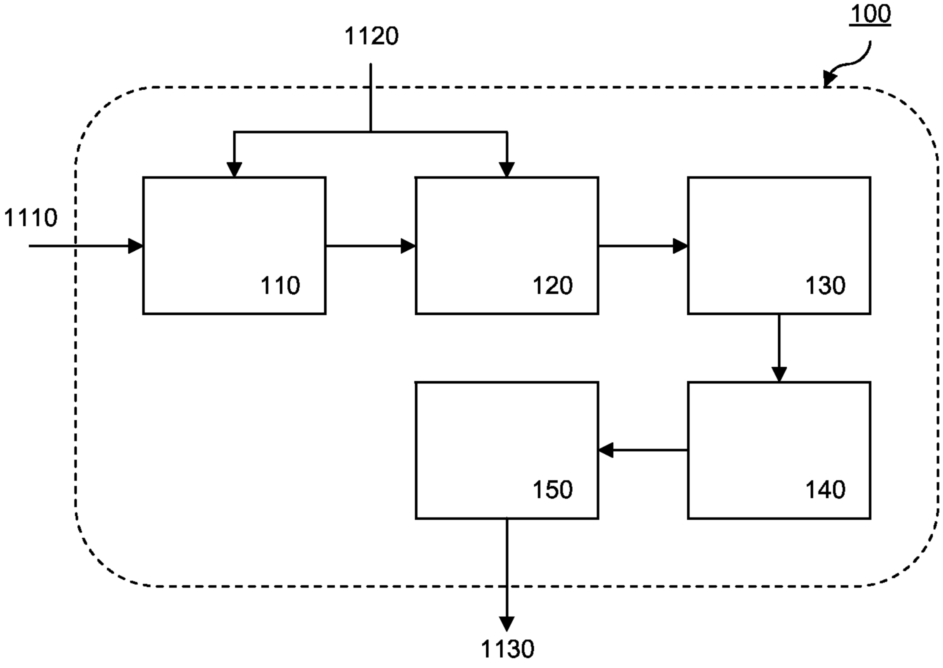
FIG. 5 is a schematic diagram of functional interrelationships between different operations of the Cell processor in accordance with an embodiment of the present invention.

Referring now also to FIG. 5, typically the Cell processor is used to implement this process and hence acts as an input speech time shifter 110 operable to time shift the alignment of the input speech frames in response to the phoneme mark-up of the reference performance. FIG. 5 depicts a functional interrelation between various functional units described herein that may each be implemented by the Cell processor.

After aligning the input speech frames, these speech frames are then scored with respect the phonemes they are aligned with, as described below.

The speech scoring mechanism used should be robust both to phoneme misalignment and also the inherent low accuracy of per frame phoneme scores as discussed previously, both of which are difficult to completely avoid.

In response, the present inventors have devised a method that is suitably robust for scoring user speech performance in RapStar.

They firstly observed that correct-phoneme posterior probabilities p(q|x) (hereafter CP values) are easier to construct an accurate word score from than correct phoneme likelihoods p(x|q), in part because they are less variable.

In this regard, the Cell processor can act as a phoneme probability generator 120 operable to generate probability values for a plurality of phonemes of the type described above.

Optionally, to reduce computational overhead only the central phoneme state of the three for each phoneme is evaluated.

They then appreciated that as an indicator of rap performance with respect to the reference performance (where rhythm is the major determinant), it is not particularly significant whether a person says, for example, 'beg' or 'big', or similarly 'bun' or 'ban'. Since the purpose is not to fully differentiate and identify unknown free speech, but instead to determine whether a user's performance of a rap is following a reference performance of a rap, then correct broad-class phoneme posterior probabilities (hereafter CBP values) are more useful (robust) in turn than CP values.

A CBP value is a sum of CP values for a plurality of phonemes pre-defined as all belonging to a broad class. A non-limiting example may be a broad class comprising the phonemes 'b', 'p' and 'd'.

In other words, for an input speech frame, the probabilities generated for all the phonemes in the same broad class as the marked-up phoneme to which the input speech frame is aligned can be summed together to generate a CBP value. When the input speech is within the broad class (for example when the input sounded like a 'b' whilst the mark-up was a 'p'), then the CBP value is likely to be high as many phonemes within the class will have a higher posterior probability. By contrast if the input sounded like an 'f' whilst the mark-up was a 'p', then the correct broad phoneme class incorporating 'p' is much less likely to have high posterior probabilities (whilst an incorrect class incorporating 'f' is likely to have high posterior probabilities).

In this regard, again the Cell processor may act as a phoneme class probability generator 130 operable to generate a probability value for a phoneme class based upon the to generated probability values for a plurality of phonemes belonging to that phoneme class, as described above, and moreover the phoneme class for which probability values are generated is the phoneme class comprising the phoneme mark-up to which the respective frame of input speech has been aligned.

Finally, the inventors then appreciated that averaging the CBP values (hereafter ACBP values) over a whole word, or for example 300 milliseconds if longer, was even more robust than using CBP values alone.

Again the Cell processor may thus act as an averaging means or logic 140 operable to average phoneme class probability values corresponding to a plurality of frames of the input speech.

Figure 6C:
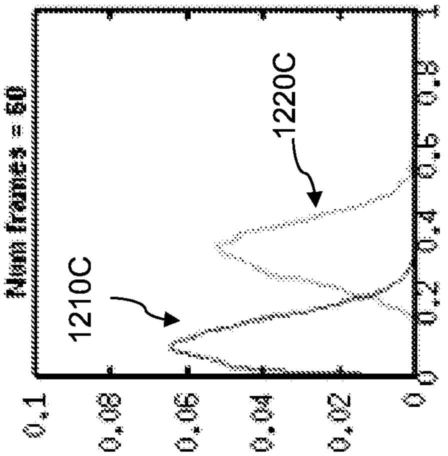
FIGS. 6A to 6C are schematic diagrams of score distributions for three different score averaging schemes in accordance with embodiments of the present invention.
Figure 6B:
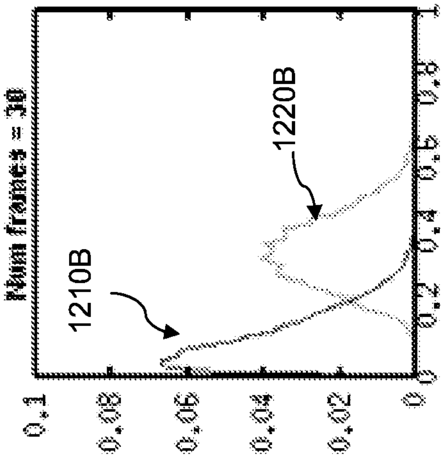
Figure 6A:
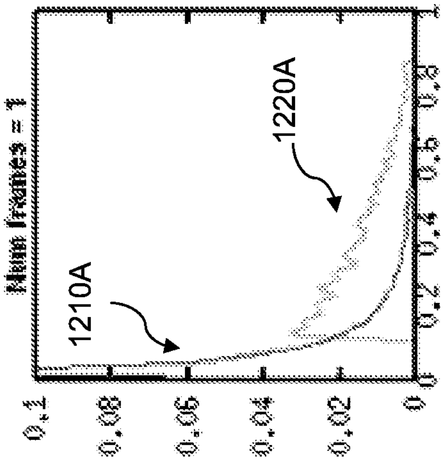

Referring to FIGS. 6A-C, the robustness of the ACBP values can be understood if one models the occurrence of an accurately labelled phoneme as a random process (a Bernoulli trial, like tossing a coin) having chance K of success with each trial. The distribution of the proportion of successes after N trials has an expected value K and a variance K(1-K)/N. This means that the measured proportion of successes becomes ever closer to the true proportion of successes as N increases, and the variance about K gets smaller. For the ACBP values, N corresponds to the length of the average, whilst the value of K upon which the trial converges will depend on the average accuracy as reflected in the constituent CBP scores.

By contrast, random babbling will sometimes hit one or two correct phonemes (especially when it is only required to get the correct broad-class phoneme), but the chances of babbling getting a high proportion of the phonemes in a word right (and in the right order) is very low, provided that the word is long enough.

Consequently, a moderately accurate user performance will produce an input speech sequence with a high proportion of correct broad-class phonemes, which will converge on one score (one expected value), whilst a poor performance (e.g.

babble) will generate an input speech sequence with a low proportion of correct broad-class phonemes that will converge on another, lower score. Hence taking the mean of the CBP scores over a sufficient period provides an approximation of the expected value and a means to classify whether the input from the user is converging on a good or a poor (bad) performance.

Experimentally, the variance around the expected value for averages of correct-broad-class-phoneme scores for well performed words becomes usefully distinguishable from the variance around the expected value for averages of random sounds when the scores are averaged over a window of at least 200 ms; consequently the classification of a good or bad performance is possible on a per-word basis, as desired, since most performed words are of the order of 200 ms or longer.

As noted above, in practice accurate labelling is not a binary variable but rather a CBP score, and so an accurate labelling hit rate is also not a discretely quantifiable value. However, high CBP scores indicate more accurate labelling, whilst low CBP scores indicate less accurate labelling, and so convergences on good and bad expected values can still be expected. Hence ACBP scores for generally good performance will converge on one expected value, whilst ACBP scores for generally poor performance will converge on a second, lower expected value.

This is illustrated in FIGS. 6A-C. In these figures, ACBP scores (on an arbitrary scale) are shown on the X axis and a population on the Y axis, normalized to a total of 1. The figures thus represent an ACBP score distribution. In FIG. 6A, the ACBP scores are averaged over one frame (i.e. the ACBP is in practice a CBP, with no averaging). The resulting distribution of ACBP scores 1210 for 'bad' input speech (an input of a recording of a different rap song to the one for which the phoneme mark-up is being compared) heavily overlaps the distribution of ACBP scores 1220 for 'good' input speech (a proper attempt to rap the correct song). In other words, there is a wide variance with respect to the expected values of good and bad performances In FIG. 6B, the ACBP is averaged over 30 frames (i.e. 300 ms), and the resulting distribution of ACBP scores for bad and good input speech shows much less variance about the expected values (since an average over 30 CBP scores is equivalent to a longer trial N and hence is a better approximation of the expected value than a single CBP score) and so there is less overlap, making the good and bad performances more readily distinguishable. It will be appreciated that in this case a threshold score of 0.2 on this arbitrary scale would provide a relatively robust indicator of good rap performance.

In FIG. 6C, the ACBP is averaged over 60 frames (i.e. 600 ms), and the resulting distribution of ACBP scores for bad and good input speech shows less variance still with respect to the expected values, and hence even less overlap between good and bad performances.

It can be seen that as the ACBP scores are averaged over longer and longer periods, they are converging, like a Bernoulli trial, on an expected value of approximately 0.35 for the good input speech and 0.07 for the bad input speech on this arbitrary scale.

In practice, however, in order to achieve a responsive scoring system, the ACBPs averaged over the longer of the word length or 30 frames (300 ms) are considered sufficiently accurate estimations of the expected value to distinguish most performances as good or bad (although it will be appreciated that more generally this may be changed by a designer, for example over the longer of a pre-selected value in the range of 200 ms to 600 ms and the duration of the most recently spoken word by the user). In this case, a threshold dividing the good and bad performances (in this case for example at a value of 0.2) would correctly classify the vast majority of performances properly as good or bad.

Figure 7:
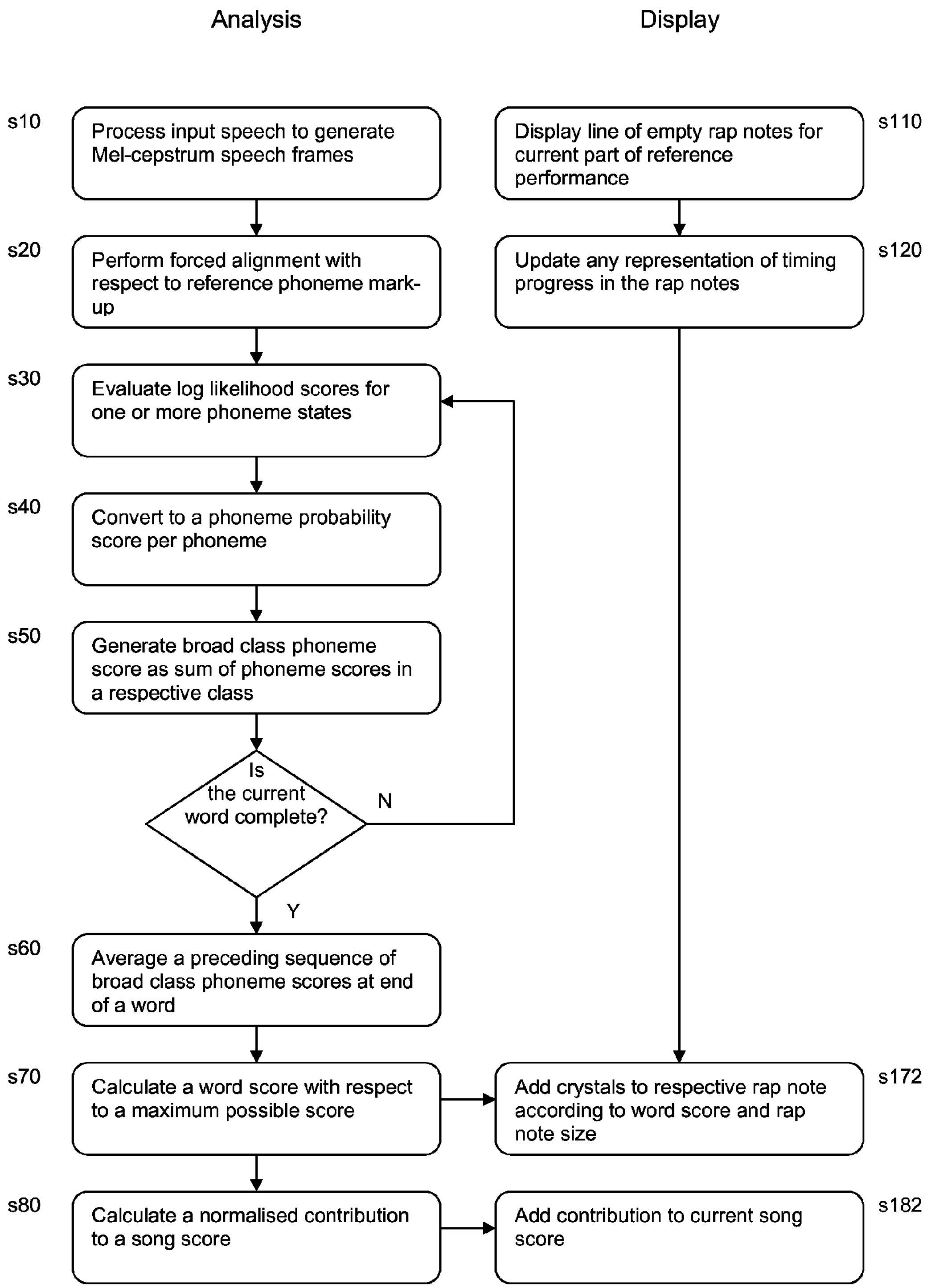
FIG. 7 is a flow diagram of a method of user speech performance evaluation in accordance with an embodiment of the present invention.

Referring now to FIG. 7, in an embodiment of the present invention the steps used in a method of obtaining an ACBP hence typically comprise:

1. In a first step s10, pre-processing the input speech to obtain a vector of Mel-cepstrum features (a speech frame) x[t], every 10 ms;
2. In a second step s20, using run-time forced alignment (together with trained phoneme models, as described above) to obtain a best-fit or near best-fit alignment, w[t], of the input speech frames with the phoneme-state rap song mark-up, m[t], for each word as it is spoken;
3. In a third step s30, for each frame, evaluating log likelihood scores log p(x[t]|s) at least for the central state, s, of every phoneme;
4. In a fourth step s40, using Bayes' rule to convert these to a phoneme probability score, P(Ph|x[t]), for each phoneme, Ph;
5. In a fifth step s50, obtain a CBP probability by summing probabilities for all phonemes in a relevant class, where classes are predetermined; and
6. In a sixth step s60, if the current frame aligns with a word ending, obtain an ACBP (average CBP) over all preceding frames in the word or over 300 ms preceding the end of word, whichever is longer.

This ACBP may then be used to generate a word score as follows.

7. In a seventh step s70, if MaxPossScore is the maximum possible ψ (Psi) score (where ψ is the cumulative distribution function of the Gaussian CDF) for this word (for a selected difficulty level, as described below), then the final word score out of 1 is:

PCent=ψ(ACBP; Mu, SD)/MaxPossScore for the Gaussian distribution of ACBP scores with mean Mu (which can be modified according to difficulty level, see below) and standard deviation SD.

To perform this calculation, the Cell processor thus acts as a calculating means or logic 150 operable to calculate a user speech performance score 1130 based upon the average.

8. In an eighth step s80, the contribution to a total score=(PCent)×(number of phonemes in word)×(normalisation factor for current rap song), leading to a standard fixed maximum possible score of, for example, 10,000. Thus the user speech performance score for a word is normalized according to a normalisation factor specific to the current reference performance and added to an overall performance score.

In an embodiment of the present invention, the Gaussian distribution of ACBP scores used in step s70 above is pre-computed. As could be seen from FIGS. 6B and 6C in particular, the distribution of ACBP scores centres on an expected value. Taking the Bernoulli trial analogy further, for a representative sample of marked-up songs, the expected value indicated by ACBP scores for good speech inputs to these songs can be taken as the expected value of all good performances for all songs (since these will share the same phonemes). Thus the expected value, or mean value Mu, of a Gaussian distribution of ACBP scores can be computed in advance.

Mu can then be moved to control the difficulty level of the game in scoring step s70 above, as this determines the spread of actual ACBP scores that will be classified as good.

Hence in an embodiment of the present invention, given a set of good input performances, the corresponding respective good ACBP scores can be used to generate good mean and standard deviation values over all these performances (MuGood, SDGood). Similarly, given a set of bad input performances, the corresponding respective bad ACBP scores can be used to generate bad mean and standard deviation values over all these performances (MuBad, SDBad).

One may then obtain a score out of one for a song word [i] from its ACBP score as follows:

i. MaxPossScore=a pre-computed maximum possible score Psi-score for word [i];

ii. For game difficulty level (easy, medium, hard) set alpha=(−1, 0, 1)

iii. vMin=MuBad+alpha*SDBad iv. vMax=MuBad+min(3*SDBad, Max PossScore)

v. $Mu_{Level}$=(vMin+vMax)/2.0 vi. Score-out-of-one=ψ(ACBP; $Mu_{Level}$, SDGood)/MaxPossScore

Where ψ(x; Mu, SD) is again the cumulative distribution function for the Gaussian distribution of scores x with a mean Mu and a standard deviation SD.

The score out of one for a word then determines the number of points awarded as described above, and also determines the number of whole, and optionally part, crystals added to a rap note. For example, the crystals can be added to the nearest half crystal in proportion to the score and the number of crystal spaces, so that a rap note with space for two crystals will be gain one crystal for a score of 0.5, whilst a rap note with space for four crystals will gain two and a half crystals for a score of 0.68.

Because the number of crystal spaces is dependent on rhythm data rather than syllable or phoneme data for a word, the resulting number of crystals awarded is therefore dependent on both the rhythm of the reference performance and the user's time-aligned performance as scored based upon the ACBP score for the word (or the last 300 ms).

Hence referring again to FIG. 7, in parallel to the above user performance score calculation process, in a first step 110 a line of rap notes for the current line of rap is displayed as described previously, and optionally in a second step 120 a progress indicator such as a colour change similar to a progress bar or similar is used to indicate progress of the reference performance with respect to the rap notes.

Then at a third step s172, the calculated word score is used to populate the corresponding rap note with an appropriate number of crystals, and at a fourth step 182, the song score is updated with the normalized contribution from the calculated word score.

Referring now to FIG. 8, rap score performance tests are shown for performances of five different rap songs in English by one male and one female singer. The table of FIG. 8 is divided into three major columns respectively for the male singer, then for the female singer, and then for three noise (unrelated speech) tracks. The table is also divided into three major rows for three difficulty levels easy, middle and hard (corresponding to alpha=−1, 0, 1 in the method described above). Hence the table comprises nine sub-tables.

The rows of each sub table correspond to the five reference performances. The columns for the male and female sub tables represent their five performances. The values in these sub tables represent the percentage of the maximum possible score obtained with respect to a reference performance by a user performance. Hence the diagonals represent the user's actual performance of the corresponding reference rap song. Therefore as should be expected, the diagonals show the best scores.

It will be appreciated that in each case there is a clear separation of scores between the corresponding performances on the diagonals and the non-corresponding performances elsewhere in each sub table for the male and female singers, indicative that good and bad performances of the rap can be clearly distinguished. Moreover, the performances of the male and female singers are reasonably consistent over the five songs within each difficulty level.

Meanwhile background noise such as party babble (column n1), group babble (column n2) and PS3 voice commands (n3) are all scored consistently lower even than the incorrect rap performances.

Thus the above techniques provide a more consistent performance feedback to the player than the prior art, and which as described above is timely (e.g. to within one word or 300 ms) and detailed (providing rap crystal and point feedback per word), and which does a good job of distinguishing accurate rapping from random speech, as seen in FIG. 7.

Finally, it will be appreciated that the methods disclosed herein may be carried out on conventional hardware suitably adapted as applicable by software instruction or by the inclusion or substitution of dedicated hardware.

Thus the required adaptation to existing parts of a conventional equivalent device may be implemented in the form of a non-transitory computer program product or similar object of manufacture comprising processor implementable instructions (a computer program) stored on a data carrier such as a floppy disk, optical disk, hard disk, PROM, RAM, flash memory or any combination of these or other storage media, or may be transmitted via data signals on a network such as an Ethernet, a wireless network, the Internet, or any combination of these of other networks, or realised in hardware as an ASIC (application specific integrated circuit) or an FPGA (field programmable gate array) or other configurable circuit suitable to use in adapting the conventional equivalent device.

We claim:

1. A method of user speech performance evaluation with respect to a reference performance for which a phoneme mark-up is available, the method comprising the steps of:

capturing input speech from a user and formatting it as frames; and for a respective frame of the input speech, generating probability values for a plurality of phonemes;

generating a probability value for a phoneme class based upon the generated probability values for a plurality of phonemes belonging to that phoneme class; and for a plurality of frames of the input speech, averaging the phoneme class probability values corresponding to the plurality of frames of the input speech; and calculating a user speech performance score based upon the average.

2. A method according to claim 1, comprising the step of:

time shifting an alignment of the input speech frames responsive to the phoneme mark-up of the reference performance.

3. A method according to claim 2, in which the phoneme class for which probability values are generated is the phoneme class comprising the phoneme mark-up to which the respective frame of input speech has been aligned.

4. A method according to claim 2 in which the step of time shifting the alignment of the input speech frames responsive to the phoneme mark-up of the reference performance uses a dynamic programming method.

5. A method according to claim 2, in which a maximum permissible time shift of input speech frames is preset.

6. A method according to claim 1, in which the probability values for phonemes are phoneme posterior probabilities.

7. A method according to claim 1, in which the step of averaging the phoneme class probability values is conducted over the longer of a pre-selected value in the range of 200 ms to 600 ms and the duration of the most recently spoken word by the user.

8. A method according to claim 1, in which the step of calculating a user speech performance score comprises calculating a cumulative distribution function for a distribution having a known standard deviation and a mean modified by a difficulty level.

9. A method according to claim 1, comprising the step of normalising a user speech performance score for a word according to a normalisation factor specific to a current reference performance and adding the normalised score to a performance score.

10. A method according to claim 1, comprising the steps of generating for display a line of one or more graphic elements each corresponding to a word in a current portion of the reference performance, with each graphic element comprising one or more empty spaces; and upon calculation of a user speech performance score for one of the words, modifying the corresponding graphic element to wholly or partially fill one or more of the empty spaces as a function of both the user speech performance score and the number of empty spaces in the graphic element.

11. A method according to claim 10, in which the number of empty spaces ascribed to each graphic element is determined by rhythm data other than phoneme or syllable data associated with the reference performance.

12. A tangible, non-transitory computer program product comprising a storage medium on which is stored computer readable program code, the program code, when executed by a processor, causes the processor to implement a method of user speech performance evaluation with respect to a reference performance for which a phoneme mark-up is available, the method comprising the steps of:

capturing input speech from a user and formatting it as frames; and for a respective frame of the input speech, generating probability values for a plurality of phonemes;

generating a probability value for a phoneme class based upon the generated probability values for a plurality of phonemes belonging to that phoneme class; and for a plurality of frames of the input speech, averaging the phoneme class probability values corresponding to the plurality of frames of the input speech; and calculating a user speech performance score based upon the average.

13. An entertainment device for evaluating a user speech performance with respect to a reference performance for which a phoneme mark-up is available, the entertainment device comprising;

an audio input operable to capture input speech from a user and format it as frames;

a phoneme probability generator operable to generate probability values for a plurality of phonemes;

a phoneme class probability generator operable to generate a probability value for a phoneme class based upon the generated probability values for a plurality of phonemes belonging to that phoneme class;

an averaging logic operable to average phoneme class probability values corresponding to a plurality of frames of the input speech; and a calculating logic operable to calculate a user speech performance score based upon the average.

14. The apparatus of claim 13, comprising:

an input speech time shifter operable to time shift the alignment of the input speech frames responsive to the phoneme mark-up of the reference performance.

15. The apparatus of claim 14, in which in which the phoneme class for which probability values are generated is the phoneme class comprising the phoneme mark-up to which the respective frame of input speech has been aligned.

* * * * *